US012401120B2

(12) United States Patent
Huang et al.

(10) Patent No.: US 12,401,120 B2
(45) Date of Patent: Aug. 26, 2025

(54) ANTENNA MODULE

(71) Applicant: PEGATRON CORPORATION, Taipei (TW)

(72) Inventors: Chin-Ting Huang, Taipei (TW); Hsi-Kai Hung, Taipei (TW); Sony Chayadi, Taipei (TW); Chun-Kai Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 361 days.

(21) Appl. No.: 18/186,879

(22) Filed: Mar. 20, 2023

(65) Prior Publication Data

US 2023/0344127 A1 Oct. 26, 2023

(30) Foreign Application Priority Data

Apr. 25, 2022 (TW) ................................. 111115609

(51) Int. Cl.
*H01Q 5/307* (2015.01)
*H01Q 1/48* (2006.01)

(52) U.S. Cl.
CPC ............... *H01Q 5/307* (2015.01); *H01Q 1/48* (2013.01)

(58) Field of Classification Search
CPC ............ H01Q 1/22; H01Q 1/243; H01Q 1/32; H01Q 1/52; H01Q 5/30–40; H01Q 1/38–48
See application file for complete search history.

(56) References Cited

U.S. PATENT DOCUMENTS

| | | | | |
|---|---|---|---|---|
| 8,228,238 B2 * | 7/2012 | Thiam | H01Q 5/371 343/700 MS |
| 11,652,301 B2 * | 5/2023 | Yang | H01Q 19/005 343/700 MS |
| 2011/0080323 A1 | 4/2011 | Thiam et al. | |

FOREIGN PATENT DOCUMENTS

| | | |
|---|---|---|
| CN | 104253310 | 12/2014 |
| TW | M435740 | 8/2012 |

* cited by examiner

*Primary Examiner* — Hasan Islam
(74) *Attorney, Agent, or Firm* — J.C. PATENTS

(57) ABSTRACT

An antenna module includes a first antenna, a second antenna, a first ground plane, and a second ground plane. The first antenna is used to excite at a first frequency band. The second antenna is disposed beside the first antenna and includes a first radiator with a feeding end, a second radiator connected to the first radiator, and a third radiator connected to the first radiator and including a ground end. The first radiator excites at a second frequency band, and a part of the first radiator and the second radiator excite at a third frequency band. The first ground plane is located below the first antenna and spaced apart from the first antenna. The second ground plane is located below the second antenna and spaced apart from the first ground plane. The ground end is connected to the second ground plane.

10 Claims, 4 Drawing Sheets

ANTENNA MODULE

CROSS-REFERENCE TO RELATED APPLICATION

This application claims the priority benefit of Taiwan application serial no. 111115609, filed on Apr. 25, 2022. The entirety of the above-mentioned patent application is hereby incorporated by reference herein and made a part of this specification.

BACKGROUND

Technology Field

The disclosure relates to an antenna module, and in particular, to an antenna module having dual antennas.

Description of Related Art

At present, the antenna module used in the bicycle tracker (tracker) includes a GPS antenna and an LTE antenna. The bicycle tracker may perform location positioning with GPS satellites in outer space through the GPS antenna, and then transmit the location positioning data to the mobile phone and the cloud server through the LTE antenna, which enables people to track the location of the bicycle immediately.

However, in light of the bicycle tracker pursuing a light, thin, short, and small appearance, the GPS antenna is disposed very close to the LTE antenna, which leads to poor isolation between the two antennas, thereby interfering with each other and resulting in poor antenna reception.

SUMMARY

The disclosure provides an antenna module with favorable isolation between two antennas.

An antenna module of the disclosure includes a first antenna, a second antenna, a first ground plane, and a second ground plane. The first antenna is for exciting at a first frequency band. The second antenna is disposed beside the first antenna, and includes a first radiator with a feeding end, a second radiator connected to the first radiator, and a third radiator connected to the first radiator and including a ground end. The first radiator excites at a second frequency band, and a part of the first radiator and the second radiator excite at a third frequency band. The first ground plane is located below the first antenna and spaced apart from the first antenna. The second ground plane is located below the second antenna and spaced apart from the first ground plane. The ground end is connected to the second ground plane.

In an embodiment of the disclosure, the antenna module above further includes a conductor spacer connected to the second ground plane and extending from the second ground plane toward the second antenna. The conductor spacer is located between the first antenna and a part of the second antenna and separated from the first antenna and the second antenna.

In an embodiment of the disclosure, the above-mentioned antenna module further includes a third ground plane located below the second ground plane and connected to the second ground plane through multiple via holes.

In an embodiment of the disclosure, the above-mentioned first ground plane is insulated from the third ground plane.

In an embodiment of the disclosure, the above-mentioned first ground plane and the second ground plane are coplanar, and an area of the second ground plane is greater than an area of the first ground plane.

In an embodiment of the disclosure, a distance between the above-mentioned first ground plane and the second ground plane is between 0.5 mm and 1.5 mm.

In an embodiment of the disclosure, a projection of the above-mentioned first antenna to the plane where the first ground plane is located lies within the range of the first ground plane, and a projection of the second antenna to the plane where the second ground plane is located lies within the range of the second ground plane.

In an embodiment of the disclosure, the above-mentioned second antenna surrounds multiple sides of the first antenna, and the second ground plane surrounds multiple sides of the first ground plane.

In an embodiment of the disclosure, a length of the above-mentioned first radiator is ¼ wavelength of the second frequency band, and lengths of a part of the first radiator and the second radiator are ¼ wavelength of the third frequency band.

In an embodiment of the disclosure, a side length of the above-mentioned first antenna is ½ wavelength of the first frequency band.

Based on the above, the antenna module of the disclosure has the first antenna for exciting at the first frequency band and the second antenna for exciting at the second frequency band and the third frequency band so as to provide multiple applications. When the two antennas of the conventional structure are too close, the isolation is poor. In the antenna module of the disclosure, the first ground plane is located below the first antenna and spaced apart from the first antenna. The second ground plane is located below the second antenna and spaced apart from the first ground plane. The ground end of the second antenna is connected to the second ground plane. Through the design of the first antenna and the second antenna having the corresponding first ground plane and second ground plane separately, the antenna module of the disclosure may enable the first antenna and the second antenna to have more favorable isolation.

DESCRIPTION OF THE EMBODIMENTS

Figure 1:
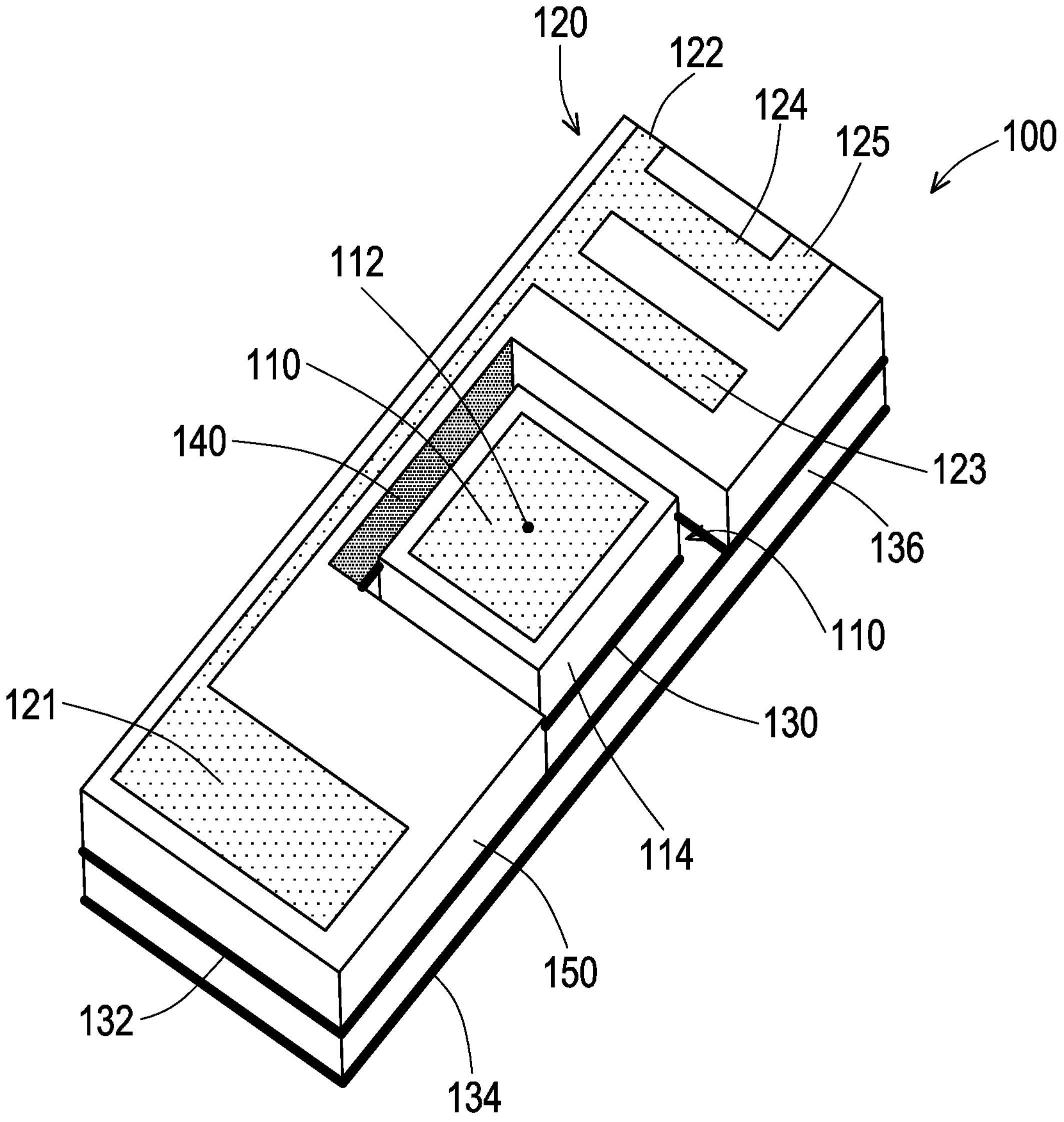
FIG. 1 is a schematic diagram of an antenna module according to an embodiment of the disclosure.

FIG. 1 is a schematic diagram of an antenna module according to an embodiment of the disclosure. Referring to FIG. 1, an antenna module 100 of the embodiment is, for example, an antenna module applied to a bicycle tracker (tracker), but the application of the antenna module 100 is not limited thereto. The antenna module 100 of the embodiment includes a first antenna 110, a second antenna 120, a first ground plane 130, and a second ground plane 132. The first antenna 110 is, for example, a GPS ceramic antenna, but the first antenna 110 is not limited thereto. The first antenna 110 is located on a ceramic medium 114, and located in the recess of an insulating support 150 and exposed to the insulating support 150. The first antenna 110 has a feeding end 112.

In the embodiment, the first antenna 110 is used for exciting at a first frequency band. The first frequency band is, for example, 1500 MHz to 1750 MHZ, and the center frequency is, for example, 1575.42 MHz. The side length of the first antenna 110 is about ½ wavelength of the first frequency band. In the embodiment, the resonance frequency of the first antenna 110 is not only determined by the side length of the first antenna 110, but also related to the dielectric constant (εr) of the ceramic medium 114.

The second antenna 120 is located on the upper surface of the insulating support 150. The second antenna 120 is, for example, an LTE antenna, but the second antenna 120 is not limited thereto. The second antenna 120 includes a first radiator 121, a second radiator 123, and a third radiator 124. The first radiator 121 is, for example, L-shaped and includes a feeding end 122. The feeding end 122 is located at one end of the first radiator 121. The first radiator 121 is used for exciting at a second frequency band. The second frequency band is, for example, 700 MHz to 960 MHz. In the embodiment, the length of the first radiator 121 is ¼ wavelength of the second frequency band.

The second radiator 123 is connected to the first radiator 121. A part of the first radiator 121 (the section from the feeding end 122 to the junction between the first radiator 121 and the second radiator 123) and the second radiator 123 may excite at a third frequency band. The third frequency band is, for example, 1710 MHz to 2170 MHz. The lengths of the part of the first radiator 121 (the section from the feeding end 122 to the junction between the first radiator 121 and the second radiator 123) and the second radiator 123 are ¼ wavelength of the third frequency band.

The third radiator 124 is, for example, L-shaped. The third radiator 124 is connected to the first radiator 121 and includes a ground end 125 at the end. In the embodiment, the feeding end 122 and the ground end 125 of the second antenna 120 extend to the same side of the insulating support 150 (the right side of FIG. 1).

In the embodiment, the first antenna 110 is, for example, a rectangular microstrip antenna (a patch antenna), and the second antenna 120 is, for example, an inverted-F antenna (a PIFA antenna), but in other embodiments, either one of the first antenna 110 and the second antenna 120 may be a PIFA antenna, a monopole antenna, a loop antenna, or a rectangular patch antenna, and the types of the first antenna 110 and the second antenna 120 are not limited thereto.

It may be seen from FIG. 1 that the second antenna 120 is disposed beside the first antenna 110, and the first antenna 110 and the second antenna 120 are quite close to each other, for example, with the distance less than 5 mm between the first antenna 110 and the second antenna 120. In this state, the antenna module 100 of the embodiment has a special design, so that there is favorable isolation between the first antenna 110 and the second antenna 120, which will be described below.

Figure 2:
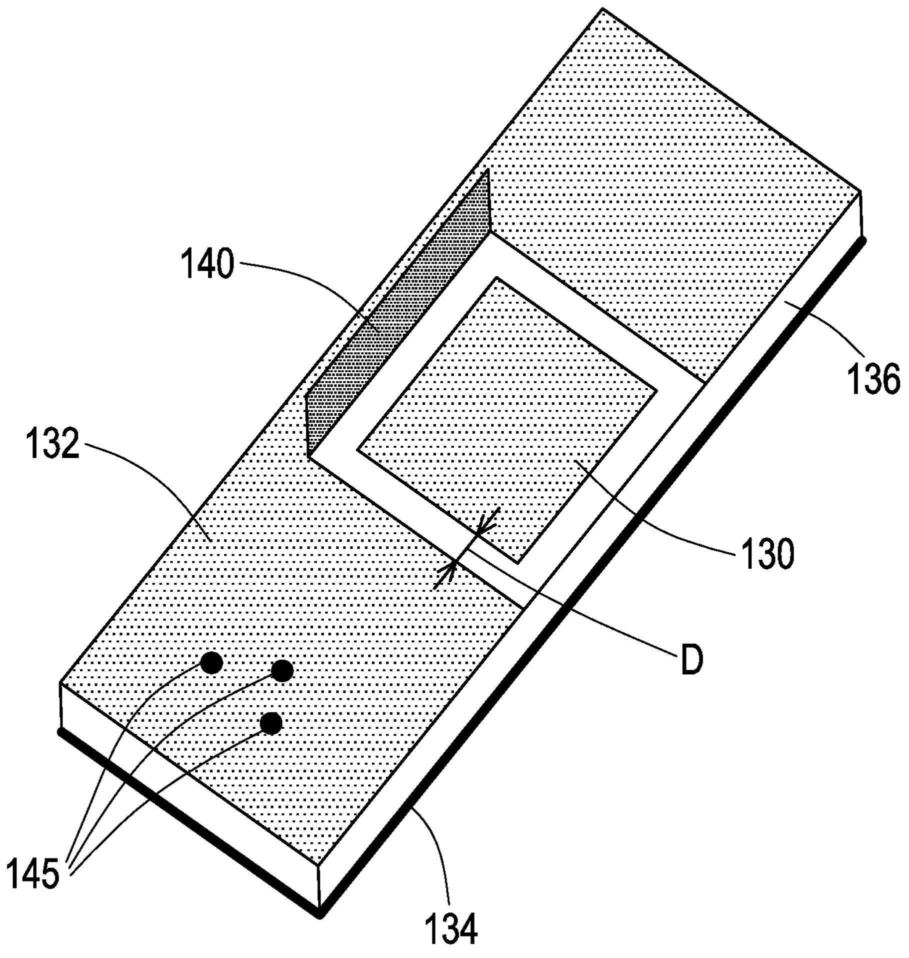
FIG. 2 is a schematic diagram of the antenna module shown in FIG. 1 with the insulating support, the first antenna, and the second antenna hidden.

FIG. 2 is a schematic diagram of the antenna module shown in FIG. 1 with the insulating support, the first antenna, and the second antenna hidden. Referring to FIG. 1 and FIG. 2, the first ground plane 130 and the second ground plane 132 are located on the lower surface of the insulating support 150 (FIG. 1). In the embodiment, the first ground plane 130 is located below the first antenna 110 and spaced apart from the first antenna 110. Specifically, the first antenna 110 and the first ground plane 130 are separated by the ceramic medium 114. The size of the first ground plane 130 is greater than or equal to the size of the first antenna 110, and the position of the first ground plane 130 corresponds to the position of the first antenna 110, so that the projection of the first antenna 110 to the plane where the first ground plane 130 is located lies within the range of the first ground plane 130.

In addition, the second ground plane 132 is located below the second antenna 120 and spaced apart from the first ground plane 130. In the embodiment, the ground end 125 of the second antenna 120 (FIG. 1) is connected to the second ground plane 132 through a conductor (not shown, such as a through hole).

In addition, it may be seen from FIG. 1 and FIG. 2 that the size of the second ground plane 132 is greater than or equal to the size of the second antenna 120, and the position of the second ground plane 132 corresponds to the position of the second antenna 120, and the projection of the second antenna 120 to the plane where the second ground plane 132 is located lies within the range of the second ground plane 132.

The antenna module 100 of the embodiment may be applied to a bicycle tracker (tracker). Since the volume of the bicycle tracker is limited, the first antenna 110 and the second antenna 120 might be disposed very closely. In order to save space, it may be seen from FIG. 1 that the second antenna 120 surrounds the multiple sides (three sides) of the first antenna 110.

Correspondingly, it may be seen from FIG. 2 that the second ground plane 132 surrounds the multiple sides (three sides) of the first ground plane 130. The first ground plane 130 and the second ground plane 132 are separated from each other, and the distance D between the first ground plane 130 and the second ground plane 132 is between 0.5 mm and 1.5 mm, for example, 1 mm.

In addition, in the embodiment, the first ground plane 130 and the second ground plane 132 are coplanar and may be formed on the same layer of the circuit board, thereby increasing convenience of manufacturing. In addition, since the second antenna 120 requires a larger ground area, the area of the second ground plane 132 is greater than the area of the first ground plane 130.

In the conventional structure, the two antennas share the same ground plane, so the isolation is not favorable between the two antennas that are very close to each other. Through the design of the first antenna 110 and the second antenna 120 corresponding to the first ground plane 130 and the second ground plane 132, respectively, and the first ground plane 130 and the second ground plane 132 being separated from each other, the antenna module 100 of the embodiment may enable the first antenna 110 and the second antenna 120 to have a more favorable isolation.

It is worth mentioning that, in the embodiment, the antenna module 100 further includes a conductor spacer 140 connected to the second ground plane 132 and extending upward from the second ground plane 132 toward the second antenna 120. The conductor spacer 140 is located between the first antenna 110 and a part of the second antenna 120 and separates the first antenna 110 from the second antenna 120. That is to say, the conductor spacer 140 spaces apart the first antenna 110 and the second antenna 120 without contacting with the first antenna 110 and the second antenna 120, so as to further improve the isolation between the first antenna 110 and the second antenna 120.

More precisely, it may be seen from FIG. 1 that a part of the first radiator 121 and the second radiator 123 of the second antenna 120 form a U-shape by surrounding, and the first antenna 110 is located inside the U-shape. The bottom section of the U-shape (that is, the narrower section of the first radiator 121) is where the first antenna 110 is closest to the second antenna 120. In the embodiment, the conductor spacer 140 is located between the first antenna 110 and the section where the second antenna 120 is closest to the first antenna 110 (that is, the narrower section of the first radiator 121) so as to improve the isolation between the first antenna 110 and the second antenna 120.

In the embodiment, the conductor spacer 140 is in a shape of a vertical plate or sheet, and is disposed on one of the vertical walls of the U-shaped notch of the insulating support 150. Certainly, in other embodiments, the conductor spacer 140 may also be U-shaped, and be disposed on three vertical walls of the U-shaped notch of the insulating support 150 to surround the three sides of the first antenna 110.

It should be noted that, in the embodiment, the antenna module 100 further includes a third ground plane 134 located below the second ground plane 132. Specifically, the first ground plane 130 and the second ground plane 132 are disposed on the upper surface of a substrate 136, and the third ground plane 134 is disposed on the lower surface of the substrate 136.

In the embodiment, the third ground plane 134 is located on the entire lower surface of the substrate 136. The third ground plane 134 is connected to the second ground plane 132 through multiple via holes 145 to increase the ground area of the second antenna 120. In addition, the first ground plane 130 is insulated from the third ground plane 134, such that the design may also enhance the isolation between the first antenna 110 and the second antenna 120.

It should be noted that, in other embodiments, the via holes 145 may be uniformly disposed on the second ground plane 132 or disposed on the edge of the second ground plane 132, and the position and the quantity of the via holes 145 are not limited thereto.

Figure 3:
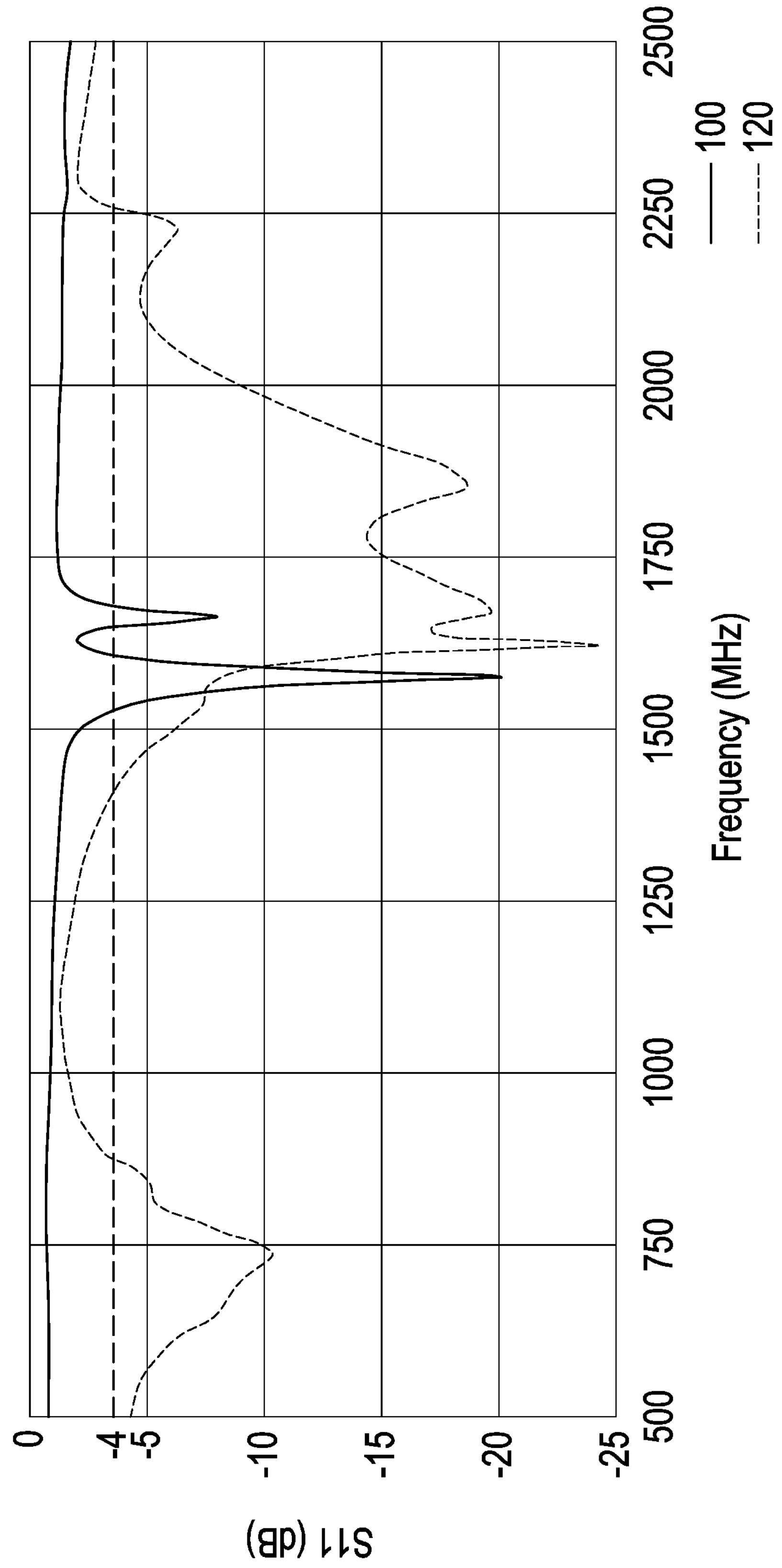
FIG. 3 is a frequency-S11 relation diagram of the first antenna and the second antenna of the antenna module shown in FIG. 1.

FIG. 3 is a frequency-S11 relation diagram of the first antenna and the second antenna of the antenna module shown in FIG. 1. Referring to FIG. 3, the first antenna 110 has favorable performance at the first frequency band (e.g., 1500 MHz to 1750 MHz, e.g., 1575.42 MHz), the second antenna 120 has favorable performance at the second frequency band (e.g., 700 MHz to 960 MHz) and the third frequency band (e.g., 1710 MHz to 2170 MHz), and S11 of the three frequency bands are all lower than −4 dB.

Figure 4:
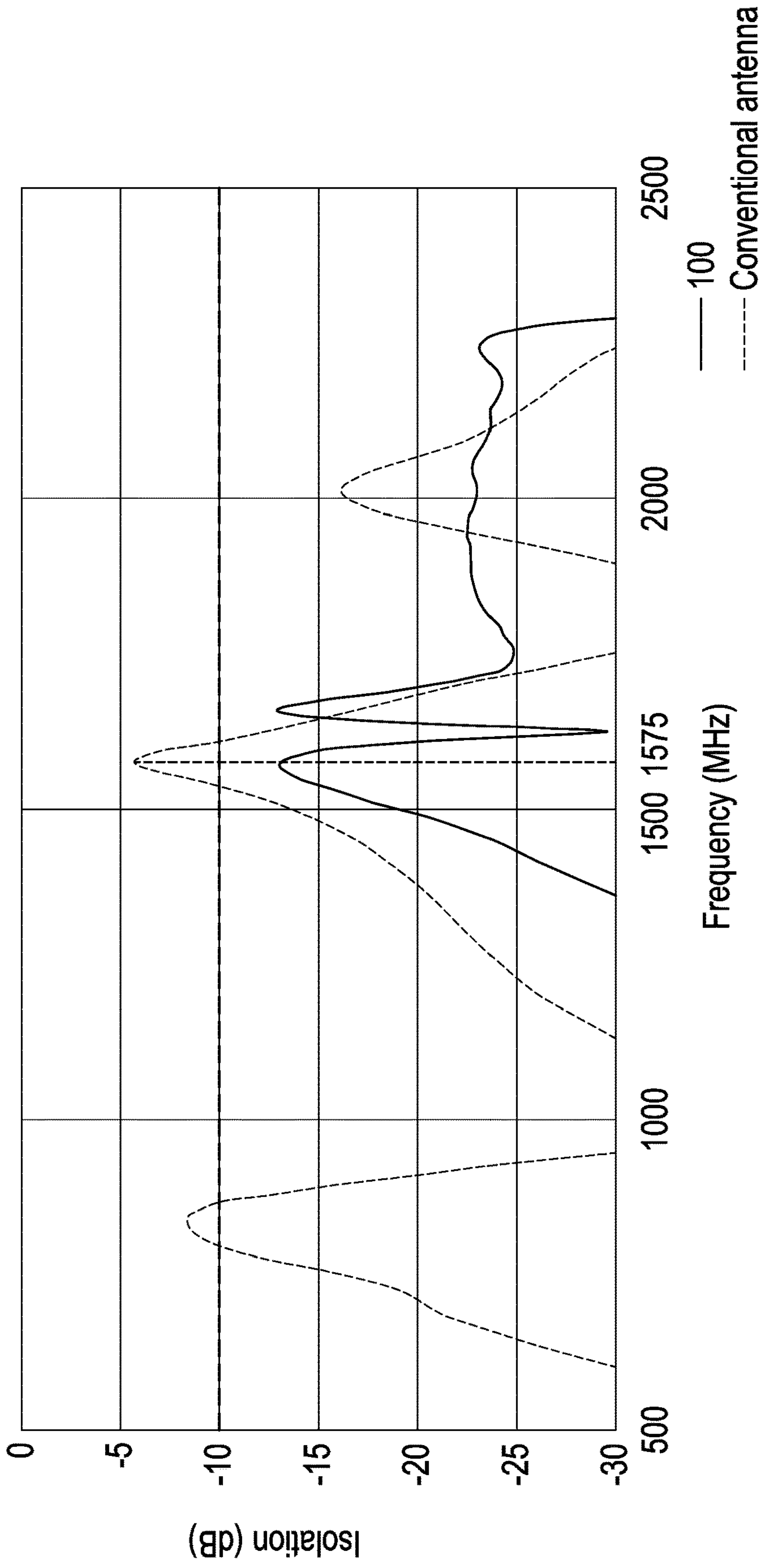
FIG. 4 is a frequency-isolation relation diagram between the conventional antenna and the antenna module shown in FIG. 1.

FIG. 4 is a frequency-isolation relation diagram between the conventional antenna and the antenna module shown in FIG. 1. Referring to FIG. 4, compared with the isolation between the two antennas of the conventional structure, the isolation between the first antenna 110 and the second antenna 120 of the antenna module 100 of the embodiment may be dropped from −6.5 dB to −13.5 dB, which is below −10.0 dB, at the operating frequency band of 1575.42 MHz. Therefore, the isolation between the first antenna 110 and the second antenna 120 of the antenna module 100 of the embodiment may have a favorable performance.

To sum up, the antenna module of the disclosure has the first antenna for exciting at the first frequency band and the second antenna for exciting at the second frequency band and the third frequency band so as to provide multiple applications. In the conventional structure, if the two antennas are too close, the isolation is poor. In the antenna module of the disclosure, the first ground plane is located below the first antenna and spaced apart from the first antenna. The second ground plane is located below the second antenna and spaced apart from the first ground plane. The ground end of the second antenna is connected to the second ground plane. Through the design of the first antenna and the second antenna having the corresponding first ground plane and second ground plane separately, the antenna module of the disclosure may enable the first antenna and the second antenna to have more favorable isolation.

What is claimed is:

1. An antenna module, comprising:

a first antenna, comprising a first feeding end, for exciting at a first frequency band;

a second antenna, disposed beside the first antenna, and comprising a first radiator with a second feeding end, a second radiator connected to the first radiator, and a third radiator connected to the first radiator and comprising a ground end, wherein the first radiator excites at a second frequency band, and a part of the first radiator and the second radiator excite at a third frequency band;

a first ground plane, located below the first antenna, and spaced apart from the first antenna by an insulating support; and a second ground plane, located below the second antenna, and spaced apart from the first ground plane by the insulating support, wherein the ground end is connected to the second ground plane.

2. The antenna module according to claim 1, further comprising a conductor spacer, connected to the second ground plane and extending from the second ground plane toward the second antenna, wherein the conductor spacer is located between the first antenna and a part of the second antenna, and separates the first antenna from the second antenna.

3. The antenna module according to claim 1, further comprising a third ground plane, located below the second ground plane, and connected to the second ground plane through a plurality of via holes.

4. The antenna module according to claim 3, wherein the first ground plane is insulated from the third ground plane.

5. The antenna module according to claim 1, wherein the first ground plane and the second ground plane are coplanar, and an area of the second ground plane is greater than an area of the first ground plane.

6. The antenna module according to claim 1, wherein a distance between the first ground plane and the second ground plane is between 0.5 mm and 1.5 mm.

7. The antenna module according to claim 1, wherein a projection of the first antenna to a plane where the first ground plane is located lies within a range of the first ground plane, and a projection of the second antenna to a plane where the second ground plane is located lies within a range of the second ground plane.

8. The antenna module according to claim 1, wherein the second antenna surrounds a plurality of sides of the first antenna, and the second ground plane surrounds a plurality of sides of the first ground plane.

9. The antenna module according to claim 1, wherein a length of the first radiator is ¼ wavelength of the second frequency band, and lengths of the part of the first radiator and the second radiator are ¼ wavelength of the third frequency band.

10. The antenna module according to claim 1, wherein a side length of the first antenna is a ½ wavelength of the first frequency band.

* * * * *